(12) United States Patent
Shao et al.

(10) Patent No.: US 9,979,192 B2
(45) Date of Patent: May 22, 2018

(54) SYSTEM AND METHOD FOR CONTROLLING A POWER DISTRIBUTION NETWORK

(71) Applicant: General Electric Company, Schnectady, NY (US)

(72) Inventors: Miaolei Shao, Altamont, NY (US); Harjeet Johal, Herndon, VA (US); Jovan Z. Bebic, Clifton Park, NY (US); Naresh Acharya, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 443 days.

(21) Appl. No.: 14/445,789

(22) Filed: Jul. 29, 2014

(65) Prior Publication Data
US 2016/0036229 A1  Feb. 4, 2016

(51) Int. Cl.
| | | |
|---|---|---|
| *H02J 3/12* | (2006.01) | |
| *G05B 15/02* | (2006.01) | |
| *H02J 3/00* | (2006.01) | |
| *H02J 3/38* | (2006.01) | |

(52) U.S. Cl.
CPC ............... *H02J 3/12* (2013.01); *G05B 15/02* (2013.01); *H02J 3/00* (2013.01); *H02J 3/382* (2013.01); *Y02E 10/563* (2013.01); *Y02E 10/763* (2013.01)

(58) Field of Classification Search
CPC ..... H02J 3/12; H02J 3/00; H02J 3/382; G05B 15/02; Y02E 40/30
See application file for complete search history.

(56) References Cited

U.S. PATENT DOCUMENTS

| | | | | |
|---|---|---|---|---|
| 3,539,865 A | * | 11/1970 | Billings ................. | H02H 9/041 361/55 |
| 5,498,954 A | * | 3/1996 | Bassett ..................... | G05F 1/14 323/255 |

(Continued)

FOREIGN PATENT DOCUMENTS

EP  2461459 A2  6/2012

OTHER PUBLICATIONS

European Search Report and Opinion issued in connection with corresponding EP Application No. 15176632.6 dated Feb. 19, 2016.

(Continued)

*Primary Examiner* — Thomas Lee
*Assistant Examiner* — Tri T Nguyen
(74) *Attorney, Agent, or Firm* — Nitin N. Joshi

(57) ABSTRACT

An electrical power system includes an electrical power distribution network and a control device configured to regulate at least one attribute of said electrical power system. The electrical power system further includes a processor coupled to the control device configured to identify an out-of-bound condition on said electrical power distribution network at a first time. The out-of-bound condition is associated with the at least one attribute. The processor is also configured to determine a trend for the at least one attribute at a second time that is later than the first time after a predetermined delay time elapses. The trend indicates a direction away from at least one of a predetermined range and a predetermined value. The processor is also configured to transmit a control action to said control device based at least in part on the trend.

21 Claims, 8 Drawing Sheets

(56) References Cited

U.S. PATENT DOCUMENTS

| | | | |
|---|---|---|---|
| 6,219,623 B1* | 4/2001 | Wills | H02J 3/383 290/40 B |
| 2006/0077605 A1 | 4/2006 | Folkers et al. | |
| 2007/0090811 A1* | 4/2007 | Labuschagne | H02J 3/24 323/217 |
| 2008/0195255 A1 | 8/2008 | Lutze et al. | |
| 2009/0281674 A1 | 11/2009 | Taft | |
| 2011/0251732 A1 | 10/2011 | Schweitzer et al. | |
| 2012/0022713 A1 | 1/2012 | Deaver et al. | |
| 2012/0029720 A1 | 2/2012 | Cherian et al. | |
| 2012/0123606 A1 | 5/2012 | Mollenkopf et al. | |
| 2013/0054162 A1 | 2/2013 | Smith et al. | |
| 2013/0127611 A1* | 5/2013 | Bernstein | G08B 21/18 340/455 |
| 2013/0173078 A1 | 7/2013 | Divan et al. | |
| 2014/0077757 A1* | 3/2014 | Liu | H02J 3/385 320/107 |
| 2016/0233681 A1* | 8/2016 | Itaya | H02J 3/12 |

OTHER PUBLICATIONS

Grainger et al., "Volt/Var Control on Distribution Systems with Lateral Branches Using Shunt Capacitors and Voltage Regulators Part I: The Overall Problem", IEEE Transactions on Power Apparatus and Systems, vol. PAS-104, Issue 11, pp. 3278-3283, Nov. 1985.

Farag et al., "Voltage regulation in Distribution Feeders with High DG Penetration: From Traditional to Smart", IEEE and Energy Society General Meeting, pp. 1-8, Jul. 24-29, 2011, Location: San Diego, CA.

Kazari et al., "Voltage Regulation through Smart Utilization of Potential Reactive Power Resources", Fifth UKSim European Symposium on Computer Modeling and Simulation (EMS), pp. 293-298, Nov. 2011, Location: Madrid.

Farag et al., "A Two Ways Communication-Based Distributed Control for Voltage Regulation in Smart Distribution Feeders", IEEE Transactions on Smart Grid, vol. 3, Issue 1, pp. 271-281, Mar. 2012.

\* cited by examiner

SYSTEM AND METHOD FOR CONTROLLING A POWER DISTRIBUTION NETWORK

BACKGROUND

Embodiments of the invention generally relate to a power distribution network and, more particularly, relate to a system and method for controlling operations of components in a power distribution network that include variable or fluctuating power generators such as, for example, a photovoltaic (PV) power generator or a wind turbine generator.

Electrical power transmission and distribution networks typically include centralized power generation plants, transmission lines, distribution lines, transformers, and other devices that facilitate electric power transmission and delivery. After electric power is generated in central generation plants, the power is typically transmitted for extended distances through high voltage transmission lines to sub-transmission/distribution substations. From the substations, power is then transmitted through a distribution network to end customers.

Some known distribution networks also include distributed power generators that may be susceptible to fluctuations caused by acts of nature, such as photovoltaic (PV) power generators or wind turbines. PV generators, for example, convert solar radiation into direct current electricity and contribute that electricity to the distribution network for local use. However, output from PV generators fluctuates with cloud cover. On cloudy days, PV generators may contribute relatively little electricity to the distribution network, where on sunny days PV generators may contribute a substantial amount of electricity to the network. Further, as clouds move through the vicinity, PV generator output may spike and dip multiple times throughout a day, presenting wide variations of overall power output contributed to the network, and relatively quick fluctuations between low and high output.

In order to control certain aspects of the distribution network, (e.g., maintaining the voltage within nominal voltage bounds), electrical power distribution networks sometimes include additional control devices such as capacitor banks and voltage regulators. These devices execute control actions that, for example, switch between operating and non-operating states, or switch in steps to alter one or more attributes such as voltage within the distribution network. These changes may help, for example, to mitigate the voltage excursions beyond the nominal voltage bounds. In some known systems without fluctuating generators such as PV, controllers are able to adequately manage voltage within given limits because shifts due to changes in network conditions are generally more predictable or less dramatic. However, the presence of fluctuating generators on the distribution network, such as PV, may lead to excessive switching operations as the control devices chase net load variability on the downstream network. Excessive switching of the additional control devices leads to reduced life spans of the devices and increased maintenance costs.

BRIEF DESCRIPTION

In a first aspect, an electrical power system is provided. The electrical power system includes an electrical power distribution network. The electrical power system also includes a control device configured to regulate at least one attribute of said electrical power system. The electrical power system further includes a processor coupled to the control device. The processor is configured to identify an out-of-bound condition on said electrical power distribution network at a first time. The out-of-bound condition is associated with the at least one attribute. The processor is also configured to determine a trend for the at least one attribute at a second time that is later than the first time after a predetermined delay time elapses. The trend indicates a direction away from at least one of a predetermined range and a predetermined value. The processor is further configured to transmit a control action to said control device based at least in part on the trend.

In another aspect, a computing device for an electrical power system is provided. The electrical power system includes an electrical power distribution network. The electrical power distribution system includes a control device. The computing device includes a processor programmed to identify an out-of-bound condition on the electrical power distribution system at a first time. The out-of-bound condition is associated with the at least one attribute. The processor is also programmed to determine a trend for the at least one attribute at a second time that is later than the first time after a predetermined delay time elapses. The trend indicates a direction away from at least one of a predetermined range and a predetermined value. The processor is also programmed to transmit a control action to the control device based at least in part on the trend.

In yet another aspect, a computer-based method for performing control actions on an electrical power system including an electrical power distribution system is provided. The electrical power distribution system includes a control device. The method uses a computing device including a processor coupled to a memory. The method includes identifying, in the memory, an out-of-bound condition on the electrical power system at a first time. The out-of-bound condition is associated with at least one attribute of the electrical power system. The method also includes computing, by the processor, a trend for the at least one attribute at a second time that is later than the first time after a predetermined delay time elapses. The trend indicates a direction away from at least one of a predetermined range and a predetermined value. The method further includes transmitting a control action to the control device based at least in part on the trend.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
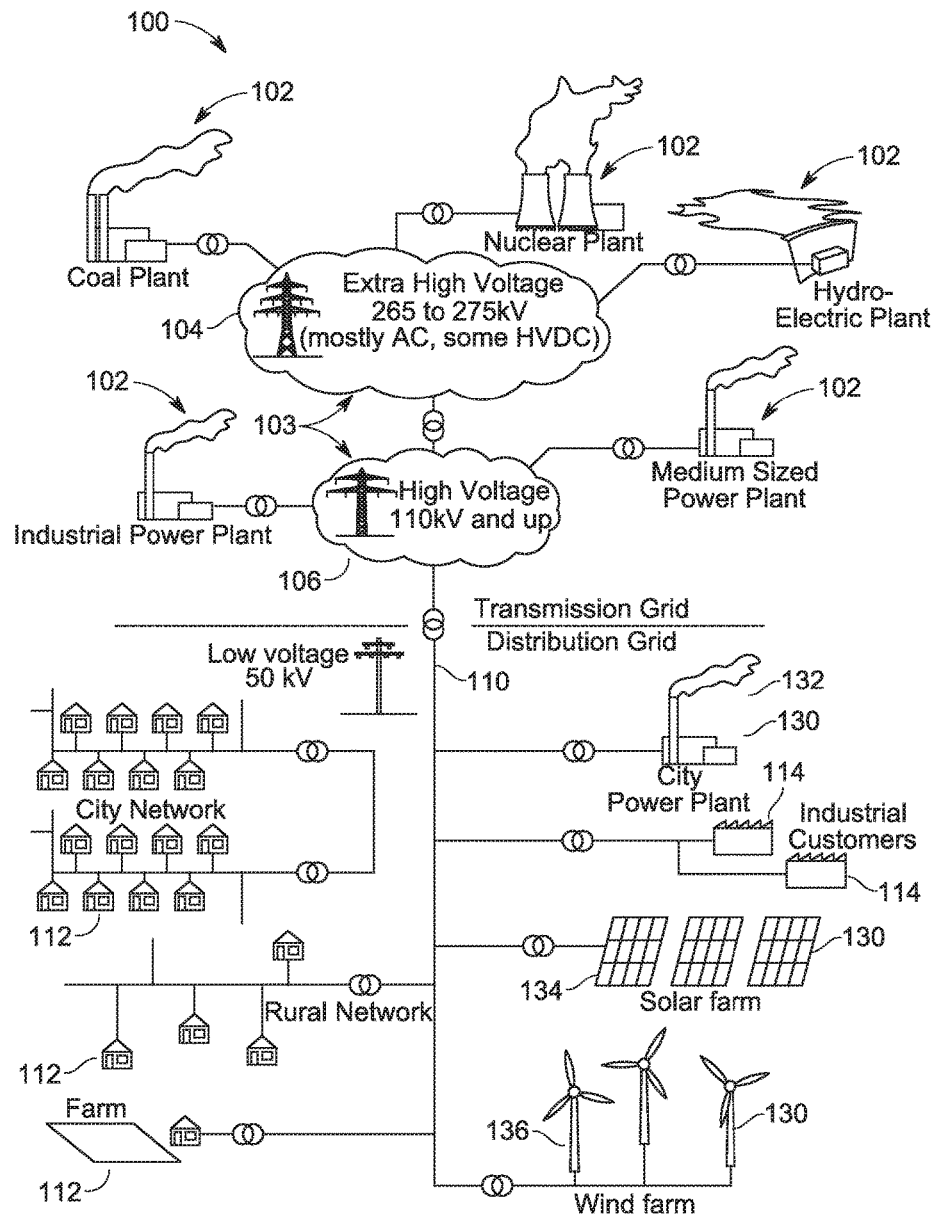
FIG. 1 is a general schematic diagram of an exemplary electrical power network including an exemplary electrical power distribution system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be one or more of combined and interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital media, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "control device" is used generally to refer to any network component or device on an electrical power network that is configured to influence one or more attributes of the network (e.g., voltage) through one or more "control actions." As used herein, the term "control action" is used generally to refer to an operational command, process, step, or action that causes a change in the network. A voltage regulator is one example of a control device that may be used to regulate voltage (an attribute) on the network. The voltage regulator performs control actions through tap change commands to regulate voltage on the network. Also as used herein, the term "controller" is used generally to refer to a module, device, or computer implemented system that manages control actions on the control device.

The methods and systems described herein provide a cost-effective method for controlling operational changes or "control actions" of network components in an electrical power system. In some embodiments, a distribution network ("distribution system") includes one or more fluctuating power generators such as, for example, photovoltaic (PV) generators. The distribution network includes a plurality of loads coupled to a power source through network buses. The distribution network also includes one or more control devices (e.g., reactive power control devices). For example, in one embodiment, a voltage regulator regulates voltage on the distribution network. A controller (e.g., a switching controller) is coupled to the voltage regulator and the plurality of loads. The controller manages control actions (e.g., switching or tap-change operations) of the voltage regulator when an out-of-bound condition is detected. The switching controller is configured to monitor the voltage levels on the network to detect out-of-bound conditions and voltage trends. The switching controller is also configured to monitor a trending value indicating an adverse or undesirable direction of change.

FIG. 1 is a general schematic diagram of an exemplary electrical power network 100 including an exemplary electrical power distribution system 110. In general, electrical power network 100 typically includes a generation portion 103 coupled to an exemplary electrical power distribution system 110. Generation and transmission portion 103 includes a plurality of power plants 102 generating and transmitting electrical power to a transmission grid which includes which includes an extra high voltage transmission grid 104 and a high voltage transmission grid 106 through which power is transmitted to an exemplary electrical power distribution system 110. Electrical power network 100 may include, without limitation, any number, type and configuration of extra high voltage transmission grids 104, high voltage transmission grids 106, and electrical power distribution systems 110, as well as any number of consumers within electrical power distribution system 110, high voltage transmission grid 106, e.g., greater than 110-265 kilovolts (kV), and extra high voltage grid 104, e.g., greater than 265 kV. The terms "system" and "network," when referring to electrical power transmission and distribution media, are used interchangeably herein.

Electrical power distribution system 110 includes low wattage consumers 112 and industrial medium wattage consumers 114. Electrical power distribution system 110 also includes distributed generators 130, including a city power plant 132, a solar farm 134, and a wind farm 136. While electrical power distribution system 110 is shown with an exemplary number and type of distributed generators 130, electrical power distribution system 110 may include any number and type of distributed generators 130, including, without limitation, diesel generators, micro-turbines, solar collector arrays, photovoltaic (PV) arrays, and wind turbines.

Figure 2:
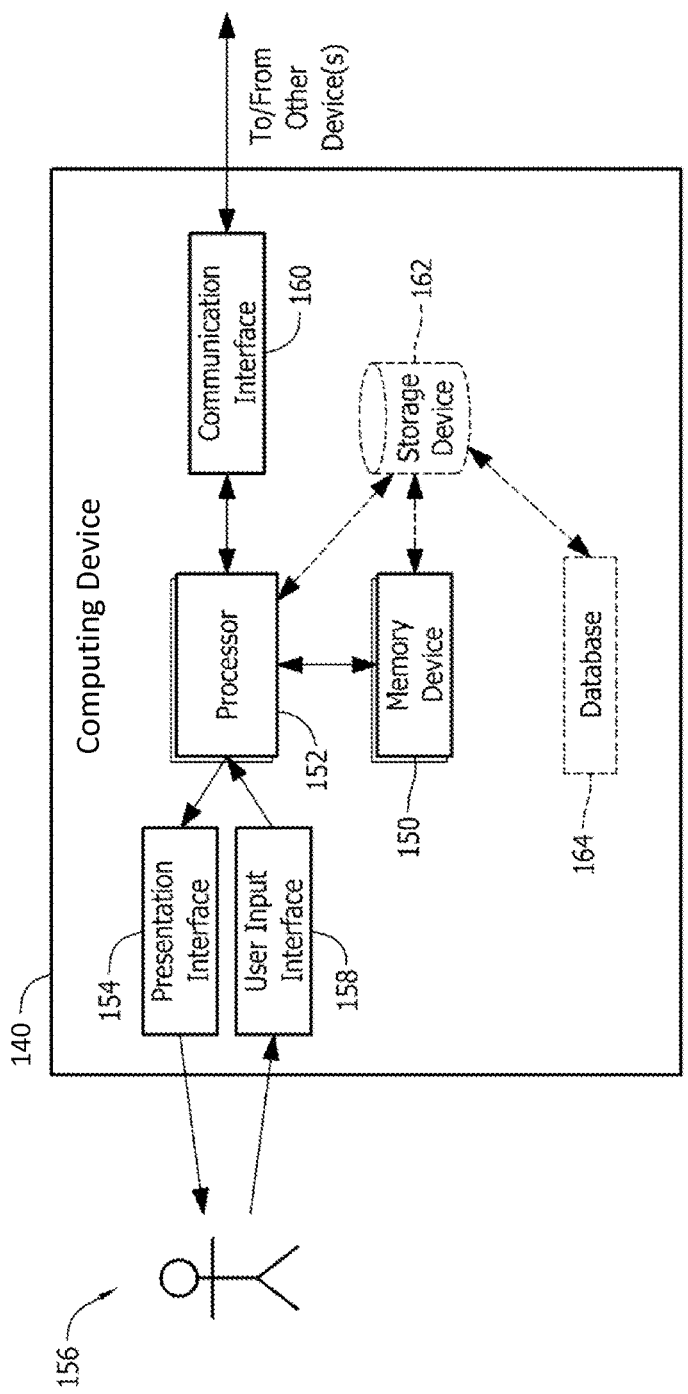
FIG. 2 is a block diagram of an exemplary computing system used to analyze the electrical power network shown in FIG. 1 and, more specifically, the distribution system shown in FIG. 1.

FIG. 2 is a block diagram of an exemplary computing system 140 used to analyze electrical power network 100 (shown in FIG. 1) and, more specifically, distribution system 110 (shown in FIG. 1). Alternatively, any computer architecture that enables operation of the systems and methods as described herein may be used. Computing system 140 facilitates collecting, storing, analyzing, displaying, and transmitting data and operational commands associated with configuration, operation, monitoring and maintenance of components in distribution system 110 such as control devices and controllers (not shown in FIG. 2).

Also, in the exemplary embodiment, computing system 140 includes a memory device 150 and a processor 152 operatively coupled to memory device 150 for executing instructions. In some embodiments, executable instructions are stored in memory device 150. Computing system 140 is configurable to perform one or more operations described herein by programming processor 152. For example, processor 152 may be programmed by encoding an operation as one or more executable instructions and providing the executable instructions in memory device 150. Processor 152 may include one or more processing units, e.g., without limitation, in a multi-core configuration.

Further, in the exemplary embodiment, memory device 150 is one or more devices that enable storage and retrieval of information such as executable instructions and other data. Memory device 150 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and non-volatile RAM (NVRAM) memory. The above memory types are exemplary only, and are thus not limiting as to the types of memory usable for storage of a computer program.

In some embodiments, computing system 140 includes a presentation interface 154 coupled to processor 152. Presentation interface 154 presents information, such as a user interface or an alarm, to a user 156. For example, presentation interface 154 may include one or more of a display adapter (not shown) that may be coupled to a display device (not shown), such as a cathode ray tube (CRT), a liquid crystal display (LCD), an organic LED (OLED) display, and a hand-held device with a display. In some embodiments, presentation interface 154 includes one or more display devices. In addition, or alternatively, presentation interface 154 may include an audio output device (not shown), e.g., one or more of an audio adapter and a speaker.

In some embodiments, computing system 140 includes a user input interface 158. In the exemplary embodiment, user input interface 158 is coupled to processor 152 and receives input from user 156. User input interface 158 may include, for example, one or more of a keyboard, a pointing device, a mouse, a stylus, and a touch sensitive panel, e.g., a touch pad or a touch screen. A single component, such as a touch screen, may function as both a display device of presentation interface 154 and user input interface 158.

Further, a communication interface 160 is coupled to processor 152 and is configured to be coupled in communication with one or more other devices such as, without limitation, components in distribution system 110, another computing system 140, one or more controllers or control devices, and any device capable of accessing computing system 140 including, without limitation, a portable laptop computer, a personal digital assistant (PDA), and a smart phone. Communication interface 160 may include, without limitation, one or more of a wired network adapter, a wireless network adapter, a mobile telecommunications adapter, a serial communication adapter, and a parallel communication adapter. Communication interface 160 may receive data from and transmit data to one or more remote devices. Computing system 140 may be web-enabled for remote communications, for example, with a remote desktop computer (not shown).

Also, presentation interface 154 and communication interface 160 are both capable of providing information suitable for use with the methods described herein, e.g., to user 156 or another device. Accordingly, presentation interface 154 and communication interface 160 may be referred to as output devices. Similarly, user input interface 158 and communication interface 160 are capable of receiving information suitable for use with the methods described herein and may be referred to as input devices.

Further, processor 152 and memory device 150 may also be operatively coupled to a storage device 162. Storage device 162 is any computer-operated hardware suitable for storing and retrieving data, such as, but not limited to, data associated with a database 164. In the exemplary embodiment, storage device 162 is integrated in computing system 140. For example, computing system 140 may include one or more hard disk drives as storage device 162. Moreover, for example, storage device 162 may include multiple storage units such as hard disks and solid state disks in a redundant array of inexpensive disks (RAID) configuration. Storage device 162 may include one or more of a storage area network (SAN), a network attached storage (NAS) system, and cloud-based storage. Alternatively, storage device 162 is external to computing system 140 and may be accessed by a storage interface (not shown).

Moreover, in the exemplary embodiment, database 164 contains a variety of static and dynamic operational data associated with distribution system components such as, for example, voltage data and other data associated with a distribution network, and model data associated with a reduced network model.

The embodiments illustrated and described herein, as well as embodiments not specifically described herein, but within the scope of aspects of the disclosure, constitute exemplary means for controlling operational actions of control devices within an electrical power system. For example, computing system 140, and any other similar computer device, added thereto or included within, when integrated together, include sufficient computer-readable storage media that is/are programmed with sufficient computer-executable instructions to execute processes and techniques with a processor as described herein. Specifically, computing system 140 and any other similar computer device, added thereto or included within, when integrated together, constitute an exemplary means for executing control operations of control devices within distribution system 110 in reaction to fluctuations from distributed generators such PV generator 130 (shown in FIG. 1) and fluctuating loads (e.g., consumer appliances and electric vehicles). Control devices may include, for example, utility switching equipment such as voltage regulators, tap changers, and capacitor banks.

Figure 3:
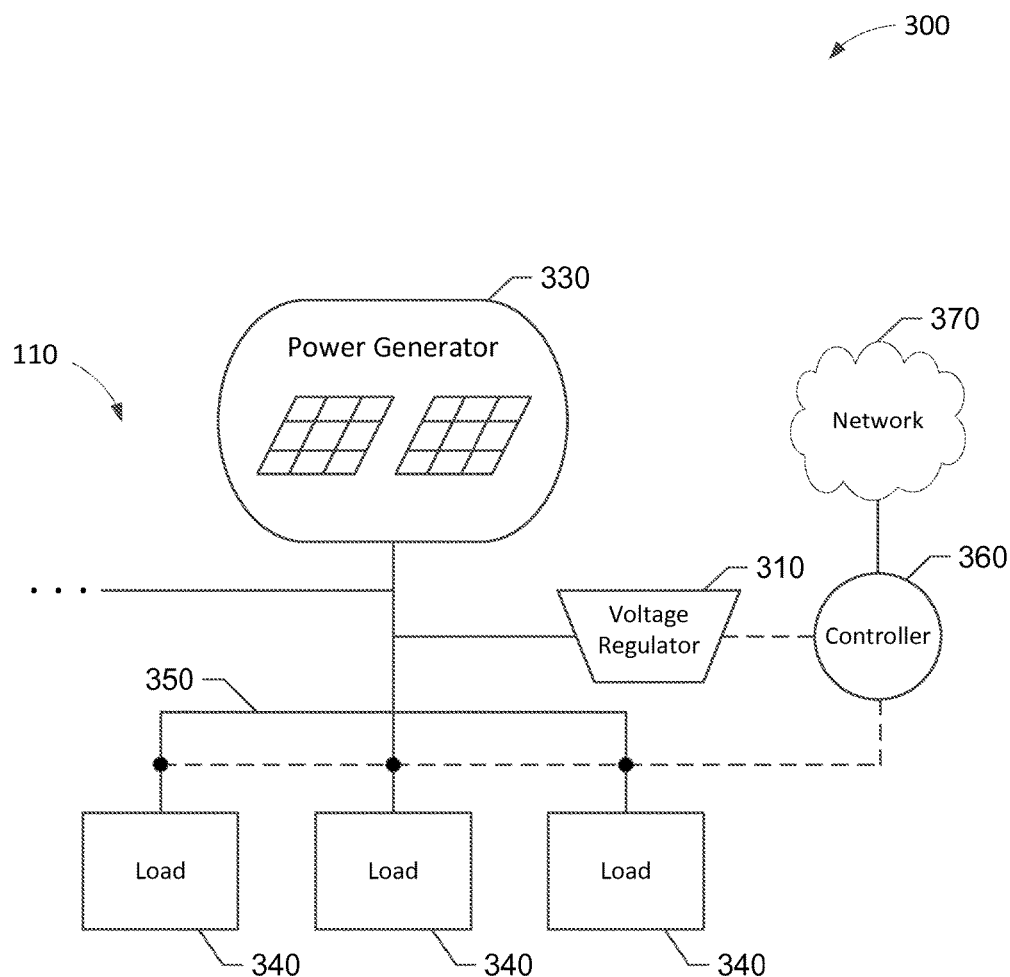
FIG. 3 is a schematic representation of the electrical power distribution system shown in FIG. 1 in which an exemplary switching controller manages fluctuating voltage levels.

FIG. 3 is a schematic representation 300 of distribution system 110 (also shown in FIG. 1) in which an exemplary controller 360 manages fluctuating voltage levels. In some embodiments, controller 360 also includes sufficient computer-readable/executable instructions, data structures, program modules, and program sub-modules, to receive other data associated with distribution network 110. Alternatively, controller 360 is a stand-alone system. In the exemplary embodiment, controller 360 includes at least one central processing unit (CPU) (not shown in FIG. 3) configured to execute one or more of the steps described herein. In some embodiments, controller 360 may be computing device 140 (shown in FIG. 2). The CPU may be coupled to other devices (not shown) via a network 370. In some embodiments, network 370 is a wireless network.

In the exemplary embodiment, distribution system 110 includes a PV generator 330 (e.g., a fluctuating power source) that generates and transmits power to a plurality of loads 340 through network buses 350. In some embodiments, PV generator 330 is similar to solar farm 130 (shown in FIG. 1). Further, in some embodiments, distribution system 110 includes one or more distributed generators such as, for example, a photovoltaic power source (e.g., PV generator 330, solar farm 130), a wind power source (e.g., wind farm 130 (shown in FIG. 1)), a thermal power source (not shown), a hydro power source (not shown), or a combination thereof. In some embodiments, PV generator 330 may include one or more residential scale photovoltaic systems, commercial scale photovoltaic systems, utility scale photovoltaic systems, or combinations thereof.

Distribution system 110, in the exemplary embodiment, includes one or more control devices, such as a voltage regulator 310, that are used to regulate attributes (e.g., voltage) within distribution system 110. Control devices may include one or more of a capacitor bank, an energy storage element, a static synchronous compensator, an on load tap changer, a voltage regulator, e.g., voltage regulator 310, or combinations thereof. Further, in the exemplary embodiment, at least one controller 360 is coupled to the control device(s), as well as to the plurality of loads 340 in distribution system 110. Controller 360 is configured to, among other things, sense or receive network attribute values from distribution system 110 and transmit/execute control actions (e.g., tap change commands) to voltage regulator 310. Control actions vary based on the type of device, but may include, for example, one or more of a discrete powering on or off of the device, and discrete or continuous switching settings that may be based on, for example, time of day, load current flow, or voltage set point.

In the exemplary embodiment, controller 360 periodically or continuously monitors the real time voltage of network buses 350 and initiates the switching operation of voltage regulator 310 as described herein. For example, a network component may be switched to an operating state to provide voltage support if the real time voltage in a particular network bus 350 deviates outside a range of operating voltage in distribution system 110. Controller 360 may be situated, for example, locally at distribution feeders (not shown) or centrally at a distribution sub-station (not shown). In some embodiments, controller 360 is configured as a function of the controller's 360 or the voltage regulator's 310 location within distribution system 110. For example, if two controllers 360 are situated at two different distribution feeders (not shown), each controller 360 controls the operations (control actions) of the network components coupled to the respective distribution feeders.

Figure 4:
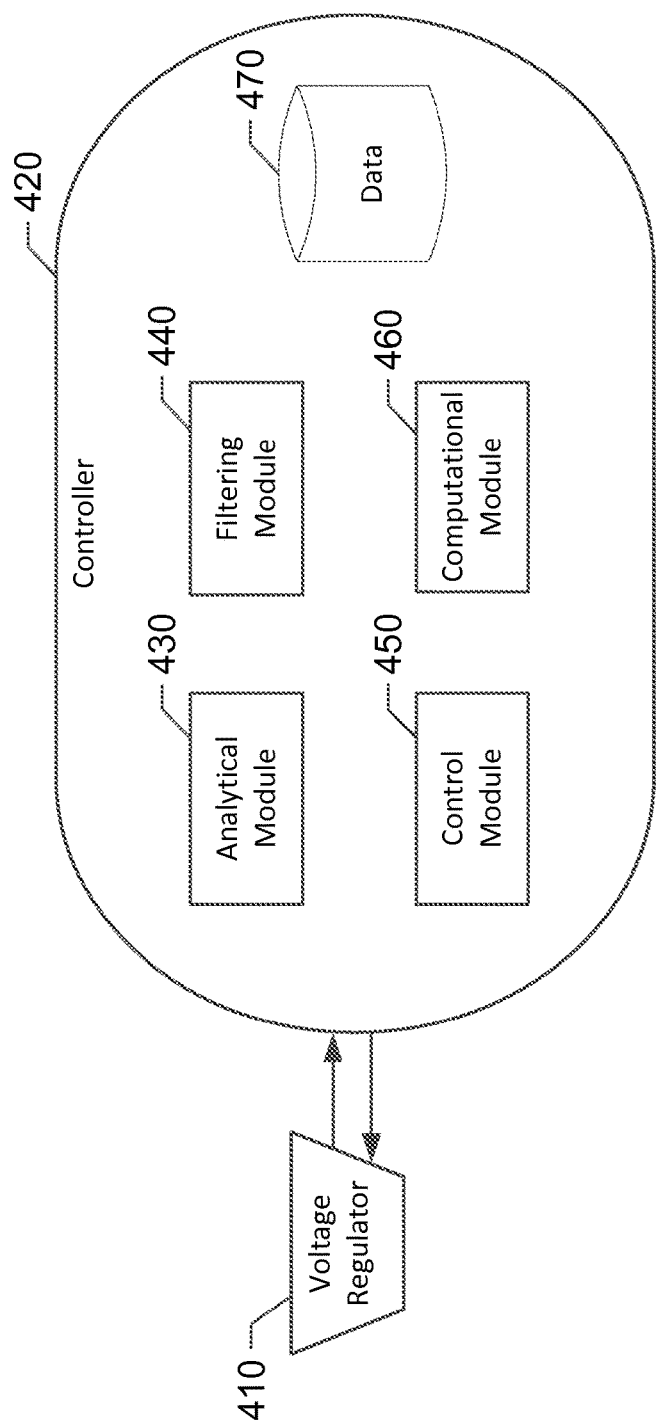
FIG. 4 is a schematic representation of the switching controller shown in FIG. 3.

FIG. 4 is a schematic representation of an exemplary controller 420. In some embodiments, voltage regulator 410 is similar to voltage regulator 310 (shown in FIG. 3), and controller 420 is similar to controller 360 (shown in FIG. 3). Controller 420, in the exemplary embodiment, includes an analytical module 430, a filtering module 440, a control module 450, and a computational module 460. In some embodiments, controller 420 and one or more of modules 430, 440, 450, and 460, may be similar to computing device 100 (shown in FIG. 2). Further, in the exemplary embodiment, controller 420 also includes a database 470.

During operation, in the exemplary embodiment, analytical module 430 receives network attribute measurements from voltage regulator 410, such as raw voltage measurements. Filtering module 440 receives the network attribute measurements from analytical module 430 and filters the measurements. Computational module 460 receives the filtered data and performs computations and analysis on the data to determine if and when to perform operational changes on voltage regulator 410. When conditions are such that computational module 460 determines a need to execute an operational change on voltage regulator 410, computational module 460 initiates the change event through control module 450. Control module 450 executes the operational change through communication with voltage regulator 410. The process for monitoring voltage values and determining when to perform operational changes is described in detail below with respect to FIG. 5.

Figure 5:
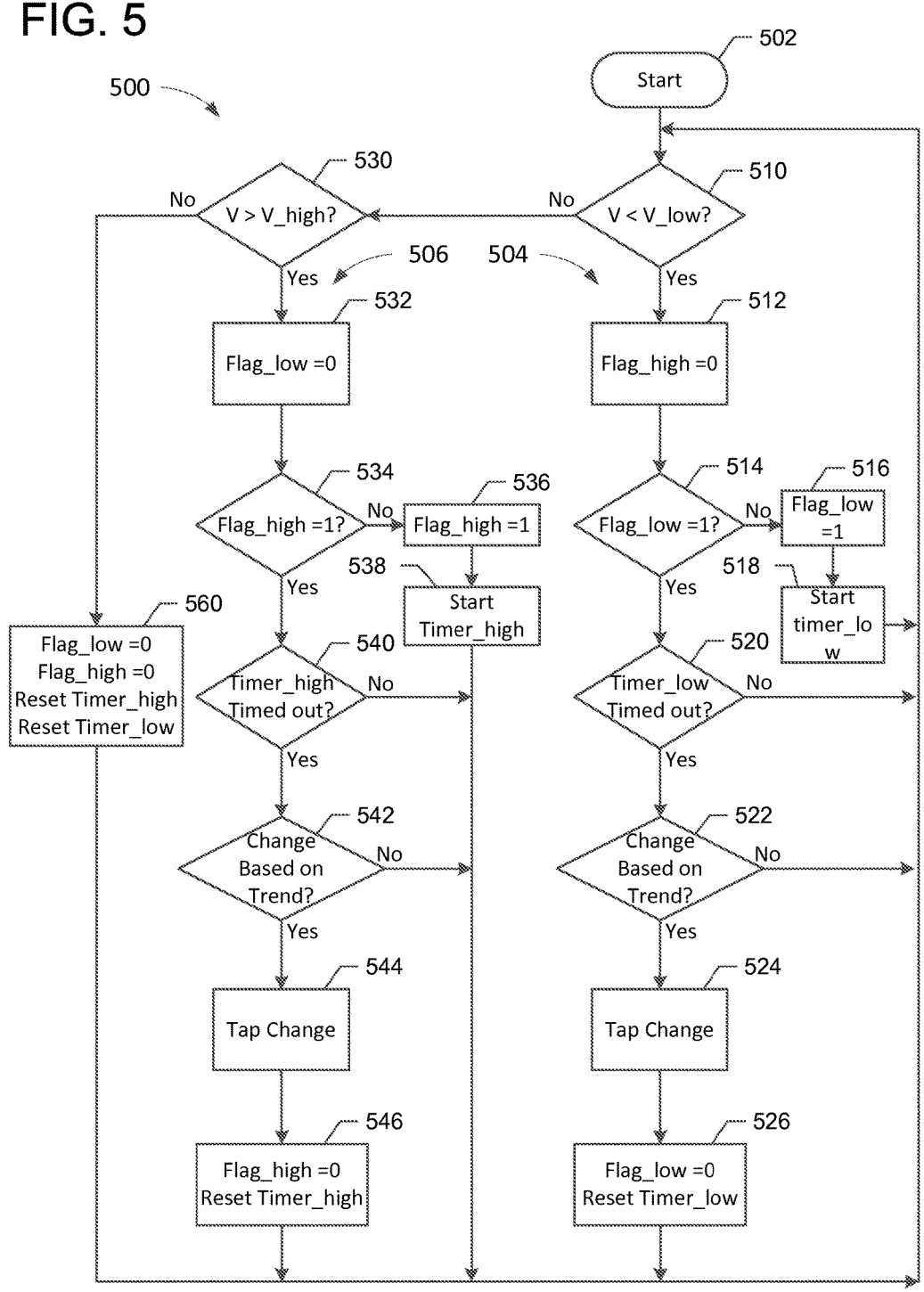
FIG. 5 is a flow chart of an exemplary process for controlling an attribute, such as voltage, on the electrical power distribution system shown in FIG. 3.

FIG. 5 is a flow chart of an exemplary process 500 for controlling an attribute, such as voltage, on electrical power distribution system 110 (shown in FIG. 3). In the exemplary embodiment, process 500 is performed by a controller such as controller 420 (shown in FIG. 4) in conjunction with a control device such as voltage regulator 410 (shown in FIG. 4). In the exemplary embodiment, process 500 utilizes several values, some of which are pre-defined values, others of which are computed on a periodic basis. Generally speaking, process 500 evaluates the two dimensions of threshold values for voltage and trending for voltage. In other embodiments, one or more additional variables may also be considered, such as current, active power, reactive power, irradiance and temperature at the controller location, season, power, or model-based predictions.

Two of the values used by process 500, in the exemplary embodiment, are a normalized voltage value, V, and a voltage trend. The normalized voltage values, V, are computed from voltage measurements received from distribution system 110. More specifically, in the exemplary embodiment, switching controller 420 receives voltage measurements or signals ("V_measure") from one or more regulation points in distribution system 110, such as at the point of interconnection for voltage regulator 410. A root mean square (RMS) of V_measure is computed, and a low pass filter is applied to the RMS value to generate a filtered signal. In some embodiments, the low pass filter may be configured to block components of the voltage signal, V_measure, that are associated with voltage variation at a frequency above a threshold frequency, as determined by a value of a high pass filter time constant $T_{LPH}$. The low pass filter output signal is divided by a base voltage base value to generate a normalized, per-unit (pu) voltage value, V. In some embodiments, a moving average window may be applied to the raw signal to filter the signal. The length of the moving window (e.g., and without limitation, 1 minute, or 10 minutes) may smooth out the high frequency oscillation of the signal. Further, a voltage trend (e.g., $\Delta V/\Delta t$) is calculated by computing the difference of the per-unit voltage, V, between a previous time step and a current time step. In other embodiments, signal processing techniques using one or more of low-pass, band-pass, and high pass filtering are used. In still other embodiments, statistical techniques using percentile or variability estimation is used. In further embodiments, raw measurement values are used.

In the exemplary embodiment, two voltage threshold values are also identified by process 500, a low voltage threshold value, V_low, and a high voltage threshold value, V_high. These two predetermined values define a targeted or preferable voltage range for the network. In some embodiments, V_low and V_high are pre-defined per-unit values. In other embodiments, a single predetermined value is used as a predetermined voltage, and the predetermined value may also include a deviation value that indicates an acceptable deviation distance from the predetermined value, thereby defining a predetermined range. As such, controller 420 and process 500 perform actions that will either tend to keep the voltage on the network between V_low and V_high or tend to move the voltage toward this predetermined range. This predetermined range may be used to determine an out-of-bound condition, as described in greater detail below.

In one embodiment, controller 420 compares a present, normalized voltage value, V, to the threshold values to determine whether V is outside of the bounds defined by V_low and V_high (e.g., an "out-of-bound condition"). If an out-of-bound condition is detected, switching controller 420 identifies whether the current voltage, V, is too high (e.g., V>V_high, an above-threshold condition) or too low (e.g., V<V_low, a below-threshold condition). Further, switching controller 420 also computes a voltage trend or "trending value." The voltage trend, in some embodiments, is a computed value representing the slope or trajectory of recent voltage levels (e.g., $\Delta V/\Delta t$). In other embodiments, the voltage trend is estimated using a network model of distribution network 110, anticipating voltage levels at some point in the future to determine the voltage trend. In other words, the voltage trend approximates whether voltage is on the rise or decreasing at one or more points on distribution network 110. Generally speaking, if switching controller 420 detects a "too high" condition and also determines that the network voltage is still on the rise, then a tap changing mechanism will be energized and switching controller 420 will issue a "tap down" operation on voltage regulator 410 in an effort to lower the future voltage levels on distribution network 110. If switching controller 420 detects a "too low" condition and also determines that the network voltage is still falling, then a tap changing mechanism (not shown) will be energized and switching controller 420 will issue a "tap up" operation on voltage regulator 410 in an effort to increase the future voltage levels on the network. Otherwise, switching controller 420 may take no action.

In the exemplary embodiment, process 500 starts at step 502, and generally includes two main threads of processing, a below-threshold thread 504 and an above-threshold thread 506. Process 500 starts 502 with examining a normalized, present voltage value, V. V is then compared to V_low at step 510. If V is above V_low, then process 500 proceeds to compare V to V_high at step 530. If V is below V_high, then process 500 proceeds to a reset step 560 where flags and timers are reset. This represents a scenario in which V is within the bounds set by V_low and V_high. As such, no network reconfiguration operations take place, and process 500 loops back to the beginning.

If, at step 510, V is less than V_low, this represents a scenario in which the normalized voltage is below the low threshold, and process 500 proceeds into the below-threshold thread 504. In the exemplary embodiment, process 500 sets a flag, "flag_high", to zero at step 512 to indicate that process 500 is not currently processing an above-threshold condition. At step 514, process 500 checks to see if another flag, "flag_low", is currently set to "1". If not, then flag_low is set to 1 at step 516, and a timer, "timer_low", is started at step 518, and process 500 loops back up to the beginning of the process. This decision branch represents an indication of the beginning of a below-threshold condition, and the beginning of a delay (e.g., for the duration of timer_low, such as 30 seconds) to a potential control action. In the exemplary embodiment, timer_low is a pre-defined length of time, and a timer function initiates a timer clock running at step 518. In other embodiments, a start time is captured at step 518 and used in later steps to determine if an amount of time defined by timer_low has elapsed. As used herein, the terms "timer_low" and "timer_high" may be used to refer to either a variable defining a time associated with a timer, or to refer to a timer associated with a below-threshold or an above-threshold condition, respectively. Additionally, either or both of these two timers may be referred to generally as "threshold timers."

The duration of timer_low, in the exemplary embodiment, is a pre-defined value such as, for example, 30 seconds. In other embodiments, the durations of timers (e.g., timer_low and timer_high) may fluctuate. For example, in one embodiment, the durations of timers may be computed relative to how far the present voltage is away from the predetermined range or a predetermined value the present voltage. For example, the delay time may be lowered if the present voltage value is relatively far from the predetermined range, indicating a need to take action in a shorter time frame. In some embodiments, a plurality of severity levels may be defined that determines the length of timers, and a separate timer value for the timers may be defined for each severity level. For example, a normal voltage level may be defined as 0.95<V<1.05 and have an associated timer value of 45 seconds, a moderate voltage level as 0.90<V<0.95 or 1.05<V<1.10 and have an associated timer value of 30 seconds, and an extreme voltage deviation as V<0.90 or V>1.10 and have an associated timer value of 10 seconds. The shorter the timer values, the more quickly controller 420 will act. However, this may lead to an increased number of operational changes. On the other hand, the longer the timer values, the slower controller 420 is to react to an out-of-bounds condition. This may lead to longer duration out-of-bounds conditions, and possibly wider swings in voltage.

In some embodiments, the timer is an interrupt-style timer that is initiated at step 518 and set to expire at a later time defined by timer_low. Interrupt timers are well known in other computing systems, and involve the processor setting a timer to expire, and subsequently notifying, or "interrupting", other ongoing processing to perform operations after the expiration of the timer (e.g., upon interrupt). In this embodiment, an interrupt timer would be set, for example, at step 518 with a duration of timer_low. Upon expiration of the timer (i.e., upon interrupt), processing would then continue processing at, for example, step 510, or at step 520.

In the exemplary embodiment, process 500 performs a subsequent pass through the below-threshold thread 504 (e.g., with flag_low=1, and timer_low initiated and active). More specifically, process 500 re-computes a later normalized voltage, V, and again recognizes that V is still below the lower threshold V_low at step 510 (i.e., the low voltage condition still exists). Flag_high is again set to zero at step 512. At step 514, process 500 recognizes that flag_low is currently set to 1 (i.e., this is a second or subsequent pass with an active below-threshold condition), and therefore passes down to step 520. At step 520, in the exemplary embodiment, timer_low is checked to determine if that time has expired. If not (i.e., if the timer associated with this below-threshold condition is still running and not yet expired), then process 500 loops back to the beginning.

In the exemplary embodiment, if the below-threshold timer, timer_low, has expired, then process 500 examines the trending value (e.g., $\Delta V/\Delta t$) at step 522. More specifically, if the voltage appears to be increasing (e.g., if $\Delta V/\Delta t$ is greater than zero, or if output of the network model indicates increasing voltage), then no action is taken, and process 500 loops back up to the beginning. In other words, the current voltage level is out of bounds, but the trajectory appears to already be heading back toward the predetermined operational range and, as such, no action may be needed to reach the predetermined range. In some embodiments, flag_low may be reset to 0 (i.e., resetting the below-threshold condition). In other embodiments, the below-threshold timer may be restarted, thereby providing another delay until the next trend check while still maintaining the current below-threshold condition. In still other embodiments, the below-threshold timer may be restarted with a different (e.g., shorter) value than timer_low, thereby providing another, shorter delay before the next trend check.

If the voltage trend is trending in an upward direction (e.g., if $\Delta V/\Delta t$ is less than zero, or if output of the network model indicates decreasing voltage), process 500 initiates a control action in the network at step 524 (e.g., tap change). More specifically, in the exemplary embodiment, process 500 initiates an upward tap change of voltage regulator 410. In other words, the current voltage level is too low, and the trajectory appears to be heading lower, away from the predetermined operational range and, as such, action may be needed to reverse the current trend. Process 500 also resets the below-threshold condition at step 526 by setting flag_low=0, resetting the below-threshold timer, and looping back to the beginning.

For above-threshold conditions, process 500 moves to step 530 and executes above-threshold thread 506. In general, above-threshold thread 506 is similar to below-threshold thread 504, but with some analysis reversed for opposite effect. In the exemplary embodiment, if, at step 530, V is greater than V_high, this represents a scenario in which the normalized voltage is above the high threshold, and process 500 proceeds into the above-threshold thread 506. In the exemplary embodiment, process 500 sets the flag "flag_low" to zero at step 532 to indicate that process 500 is not currently processing a below-threshold condition. At step 534, process 500 checks to see if flag "flag_high" is currently set to "1". If not, then flag_high is set to 1 at step 536, a timer, "timer_high", is started at step 538, and process 500 loops back up to the beginning of the process. This decision branch represents an indication of the beginning of an above-threshold condition, and the beginning of a delay (e.g., for the duration of timer_high, such as 30 seconds) to a potential control action. In the exemplary embodiment, timer_high is a pre-defined length of time, and a timer function initiates a timer clock running at step 538. In other embodiments, a start time is captured at step 538 and used in later steps to determine if an amount of time defined by timer_high has elapsed. The duration of timer_high, in the exemplary embodiment, is a pre-defined value such as, for example, 30 seconds. In other embodiments, the duration of timer_high may fluctuate, as described above in reference to timer_low. In another embodiment, the timer is an interrupt-style timer similar to that described above with respect to timer_low.

In the exemplary embodiment, process 500 performs a subsequent pass through the above-threshold thread 506 (e.g., with flag_high=1, and timer_high initiated and running). More specifically, process 500 re-computes a later normalized voltage, V, and again recognizes that V is still above the upper threshold V_high at step 510. Flag_low is again set to zero at step 532. At step 534, process 500 recognizes that flag_high is currently set to 1 (i.e., this is a later pass within an above-threshold condition), and therefore passes down to step 540. At step 540, in the exemplary embodiment, timer_high is checked to determine if that time has expired. If not (i.e., if the timer associated with this above-threshold condition is still running and not yet expired), then process 500 loops back to the beginning.

In the exemplary embodiment, if the above-threshold timer, timer_high, has expired, then process 500 examines the trending value (e.g., $\Delta V/\Delta t$) at step 542. More specifically, if the trending value is in a downward direction (e.g., $\Delta V/\Delta t$ is less than zero, or the output of the network model indicates decreasing voltage), then no action is taken, and process 500 loops back up to the beginning. In other words, the current voltage level is high, but the trajectory appears to already be heading back toward the predetermined operational range and, as such, no action may be needed to reach the predetermined range. In some embodiments, flag_high may be reset to 0 (i.e., resetting the above-threshold condition) at this stage. In other embodiments, the above-threshold timer may be restarted, thereby providing another delay until the next trend check while still maintaining the current above-threshold condition. In still other embodiments, above-threshold timer may be restarted with a different (e.g., shorter) value than timer_high, thereby providing another, shorter delay before the next trend check.

If the voltage trend is in an upward direction (e.g., $\Delta V/\Delta t$ is greater than zero, or the output of the network model indicates increasing voltage), process 500 initiates a control action in the network at step 544. More specifically, in the exemplary embodiment, process 500 initiates a downward tap change of voltage regulator 410. In other words, the current voltage level is high, and the trajectory appears to climbing away from the predetermined operational range and, as such, action may be needed to reach the predetermined range. Process 500 also resets the below-threshold condition at step 546 by setting flag_high=0, resetting the above-threshold timer, and looping back to the beginning.

In the exemplary embodiments described herein, process 500 may compute the attribute trend (e.g., voltage trend) in several different ways. In some embodiments described herein, process 500 uses a measurement-based approach that includes a value (e.g., $\Delta V/\Delta t$) as the voltage trend (e.g., at steps 522 and 542) based on actual measurements from distribution system 110 (shown in FIG. 3). This slope of voltage may be taken using two recent sample measurements taken, for example, a fraction of a second apart, or by using two sample measurements taken several seconds or minutes apart.

In other embodiments described herein, process 500 uses a model based approach to determine the attribute trend. To facilitate trend determination in this embodiment, controller 420 includes a network model of some or all of the distribution network (e.g., distribution system 110). Controller 420 uses the network model to determine trending for one or more of the examined attributes (e.g., voltage) by inputting existing conditions (e.g., sensed voltage, load, etc.) and simulating an anticipated value for the attribute(s) at a later time. This anticipated value is then used to gauge the trend, and thus to make the decision as to whether or not to execute an operational change in the distribution network at the present time. For example, at steps 522 and 542, controller 420 may compute an anticipated voltage at a future time in order to determine the voltage trend and whether or not a tap change operation (e.g., steps 524 and 544) is performed. Additional details relating to the use of a network model to determine trending is described in greater detail below in reference to FIG. 6.

Figure 6:
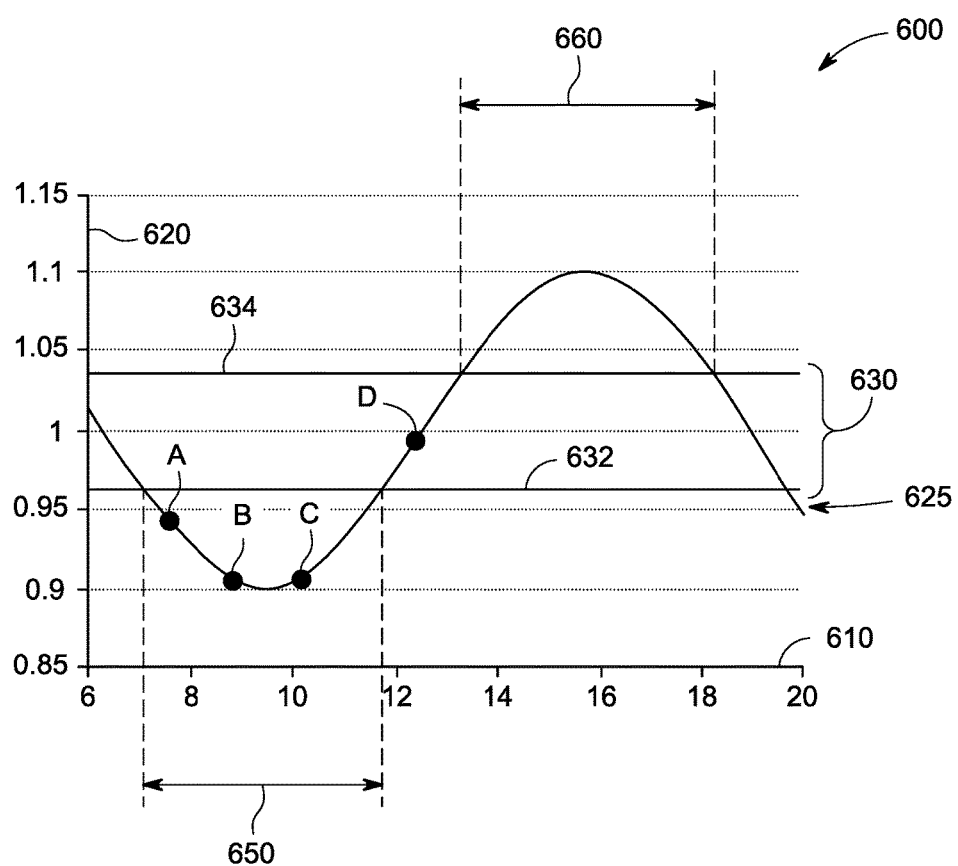
FIG. 6 is an exemplary graphical representation of filtered, normalized voltage signals from the electrical power distribution system shown in FIG. 3.

FIG. 6 is an exemplary graphical representation 600 of filtered, normalized voltage signals from electrical power distribution system 110 (shown in FIG. 3). In the exemplary embodiment, an X-axis 610 represents time in minutes (m) and a Y-axis 620 represents per-unit (pu) voltage, and a curve 625 represents the filtered and normalized voltage, V, read and computed over time, as described above. Curve 625 of voltage, V, in the exemplary embodiment, is illustrated as a purely sinusoidal wave for purposes of simplifying the description of these systems and methods.

In the exemplary embodiment, graph 600 includes a low voltage threshold value 632 (e.g., approximately 0.96 pu) and a high voltage threshold value 634 (e.g., approximately 1.04 pu). As such, a voltage range 630 between low voltage threshold value 632 and high voltage threshold value 634 represents a predetermined operating range for distribution system 110. In some embodiments, high voltage threshold value 634 and low voltage threshold value 632 are pre-defined values expressed in the units of Y-axis 620 (e.g., pu).

Graph 600, in the example shown in FIG. 6, includes a lower voltage "valley" represented by the depression in curve 625 between approximately 6 m and 13 m, and a higher voltage "peak" represented by the inclination in curve 625 between approximately 13 m and 19 m. Curve 625 dips below low voltage threshold 632 between approximately 7 m and 12 m, as represented by range 650. As such, during that time period, the network at the point of sensing is considered to be in a below-threshold condition (e.g., V<V_low). Likewise, curve 625 rises above high voltage threshold 634 between approximately 13 m and 18 m, as represented by range 660. As such, during that time period, the network at the point of sensing is considered to be in an above-threshold condition (e.g., V>V_high).

Referring to FIGS. 5 and 6, during operation, in the exemplary embodiment, switching controller 420 (shown in FIG. 4) performs process 500. In a first example, presume switching controller 420 is in a neutral state (i.e., there is no currently-active below-threshold condition nor a currently-active above-threshold condition) when process 500 begins an iteration at a time associated with point A (e.g., just before 8 m). The normalized voltage value, V, at this time, is below low voltage threshold 632. As such, at step 510, controller 420 determines that V is below the low voltage threshold 632, enters into the below-threshold thread 504, identifies that the system state is not already in a below-threshold condition at step 514, sets flag_low=1 to indicate a state change to a below-threshold condition at step 514, and starts a below-threshold timer (e.g., timer_low) for a duration of 30 seconds (e.g., timer_low=30 seconds).

Continuing this first example, presume point B represents the next iteration after expiration of timer_low (i.e., point B is more than 15 seconds later than point A). Controller 420 determines at step 510 that V at the time of point B is still below low voltage threshold 632, and thus enters the below-threshold thread 504. Controller 420 recognizes that the system state is already in a below-threshold condition at step 514, and that timer_low has timed out (e.g., expired) at step 520. Controller 420 then determines the trend for the network at step 522. In some measurement-based embodiments, controller 420 computes a trend value, such as $\Delta V/\Delta t$, based on current and past measurements. In some model-based embodiments, controller 420 computes anticipated values for one or more attributes at a future time based on present conditions and using the network model, and determines a trend for the network. Controller 420, at step 522, determines that the trend value is below zero at the time of point B, or otherwise decreasing. In other words, voltage V is still trending down after entering into a below-threshold condition at an earlier point A, and a subsequent delay of timer_low. As such, controller 420 executes a tap change command at step 524, resets the system state to a normal condition at step 526, and loops to the beginning of process 500.

In a second example, presume switching controller 420 is in a neutral state (i.e., there is no currently-active below-threshold condition nor a currently-active above-threshold condition) when process 500 begins an iteration at a time associated with point B (e.g., just after 8 m, ignoring point A for this example). The normalized voltage value, V, at this time, is below low voltage threshold 632. As such, at step 510, controller 420 determines that V is below the low voltage threshold 632, enters into the below-threshold thread 504, identifies that the system state is not already in a below-threshold condition at step 514, sets flag_low=1 to indicate a state change to a below-threshold condition at step 514, and starts a below-threshold timer (e.g., timer_low) for a duration of 15 seconds (e.g., timer_low=15 seconds).

Continuing the second example, presume point C represents the next iteration after expiration of timer_low (i.e., point C is more than 15 seconds later than point B). Controller 420 determines at step 510 that V at the time of point C is still below low voltage threshold 632, and thus enters the below-threshold thread 504. Controller 420 recognizes that the system state is already in a below-threshold condition at step 514, and that timer_low has timed out (e.g., expired) at step 520. Controller 420 then computes or otherwise analyses a trend value $\Delta V/\Delta t$ and determines that the trend value is above zero at the time of point B (e.g., rising). In other words, voltage V is now trending upward toward the predetermined operating range. As such, controller 420 does not execute a tap change command, but instead loops back to the beginning of process 500. At a later point D, when voltage V has returned to the predetermined operating range, process 500 recognizes that voltage V is not below low voltage threshold 632 at step 510 nor above high threshold 634 at step 530, and thus controller 420 resets the system state to neutral at step 560. Thus, the second example represents a condition in which controller 420 determined, after a below-threshold condition and delay time, that the voltage was already recovering, and that a tap operation may not be necessary.

In some measurement-based embodiments, controller 420 implements control actions based on two state-variables, the filtered and normalized voltage, V, and the voltage trend, $\Delta V/\Delta t$. After entering a below- or above-threshold system state, and a subsequent delay time such as timer_low, controller 420 determines operations based on the following control table:

TABLE 1

Control Table

|  | $\Delta V/\Delta t < 0$ (Decreasing) | $\Delta V/\Delta t > 0$ (Increasing) |
|---|---|---|
| V < V_low (below-threshold) | Tap Up | No Action |
| V > V_high (above-threshold) | No Action | Tap Down |

Similarly, in other embodiments, a control table in a multi-dimensional hyper-space of state variables may be used. Each state may be represented by an n-tuple of values, for example, the normalized and filtered voltage V, the derivative of voltage, a timer state, irradiation, temperature, season, and so forth. For example, in some embodiments, the voltage trend may a slope of voltage (e.g., slope of curve 625), or a difference between two time samples, both generally referenced herein as $\Delta V/\Delta t$. In other embodiments, the voltage trend may include a negative derivative of power or irradiance. In still other embodiments, conditional behavior based on discrete states such as a season of the year or a day of the week is included.

In still other embodiments, the control action is also be influenced by a current tap position of, for example, voltage regulator 410. Controller 420 is configured to be more disposed to control actions if the control is near the middle of available range. Tendency for more or less action may be controlled, for example, by adjusting the delay time after detection of an above- or below-threshold condition. For example, if the current tap position is near the middle of available range, timer_low or timer_high may be set to a shorter length of time such as 10 seconds. If, however, the current tap position is currently set to a position toward an extreme of the middle range, then controller 420 may be configured to resist further movement in that direction by increasing the length of time for that respective timer (i.e., the timer associated with movement in that direction).

In some embodiments, controller 420 implements a model based analysis to trending. More specifically, controller 420 makes at least some control decisions based at least in part on predictions generated using a network model of some or all of distribution system 110. In some embodiments, this network model may be a reduced network model. As used herein, the term "network model" refers to a computerized model which may be used to simulate actions and reactions to events on an electrical power distribution network. Further, as used herein, the term "reduced network model" generally refers to a network model of an electrical power distribution system (e.g., distribution system 110) in which a network model has been simplified, or reduced, to facilitate quicker computation during modelling simulations. Model reduction techniques for distribution networks are known in the art. In the exemplary embodiment, a reduced network model of at least a portion of distribution system 110 (shown in FIG. 3) may be installed on or otherwise available to controller 420. Network attribute values (e.g., normalized, filtered voltage V) based on recent or present voltage readings may be provided as inputs to the reduced network model and used to predict future network values and threshold trends.

In some embodiments, model based analysis may be used as a substitute for, or in combination with, the delaying and re-checking steps described above in reference to process 500 and FIG. 5 (e.g., thread 504 and thread 506). For example, in one embodiment, after determining that a below-threshold condition exists, controller 420 may immediately input recent or present voltage values into the reduced network model and generate a prediction of voltage values a certain amount of time in the future, such as the time defined by timer_low or timer_high. In other words, controller 420 may skip the timer steps such as steps 512, 514, and 520 (and their equivalent in thread 506), and instead move immediately to projecting a trend at a future time (e.g., at a length of time equal to timer_low) at step 522. In another embodiment, controller 420 may still perform the timer steps 512, 514, and 520 to loop and recheck present voltage at the later time (e.g., second pass to steps 510 and 530), and if the same out-of-bounds condition still exists, controller 420 projects trending at step 522 at a future point, such as 15 seconds later or 45 seconds later. As such, the resulting model predictions of voltage at the later time may serve as a substitute for the actual voltage or actual trending value that would be read/computed at the later time (e.g., at step 522, 542 of process 500 under other embodiments). Accordingly, in some embodiments, control actions (e.g., tap changes 524, 544) may be performed earlier in time since controller 420 does not need to wait until the later point in time to collect actual measurements. Instead, controller 420 computes the prediction using the network model and acts on that prediction.

In other embodiments, network model analysis may be used in conjunction with the delaying and re-checking steps described above in reference to process 500 and FIG. 5. For example, after determining that a below-threshold condition exists, and delaying an amount of time defined by timer_low, controller 420 may compute an actual trending value (e.g., step 522) as well as a future prediction (e.g., using the reduced network model). Controller 420 may combine the actual trending value with the future prediction while deciding whether or not to execute a control action such as tap change 524. In some embodiments, the actual trending value and the future prediction are weighted to determine whether or not to execute the control action. In other embodiments, the actual trending value may be used only if above or below a certain threshold, otherwise controller 420 may use the future prediction instead of the actual trending value.

In still other embodiments, process 500 and controller 420 may be configured to consider values from more than one location, and may be further configured to consider and take actions based on one or more of those values. For example, controller 420 may receive not only voltage values from voltage regulator 410, but also voltages from other downstream or upstream buses. As such, controller 420 may make decisions based on voltage trends on other parts of distribution system 110 relative to the predetermined operating boundaries set by, for example, low voltage threshold 632 and high voltage threshold 634.

Further, in some embodiments, reduced network modelling may be performed on a single power flow run on the allocated load, or multiple sensitivity analysis using Monte Carlo simulations by varying the allocated load at each bus. The results of the Monte Carlo simulation generates a probability distribution of voltages at each bus in the feeder. The mean and standard deviation of the voltage distribution at the buses characterizes the performance of the feeder with respect to voltage regulation. In distribution networks, the voltage at each bus should be between the low voltage threshold 632 and the high voltage threshold 630 (e.g., 0.95 pu and 1.05 pu). If the probability of voltage at a bus to be out of this range is high, then the controller acts to bring the voltage back within the predetermined range. The probability may be computed from the distribution of voltage, and a user may specify the threshold probability. For example, the controller may compute the probability of the single bus or multiple buses based on Monte Carlo simulation and may act if the probability that the voltage is outside the predetermined range is above the user-specified probability threshold.

In still other embodiments, controllers may have a control area defined as the area between the point of interconnection of a controller and the next controller. As such, each controller (e.g., controller 420) may act within its own area of control. The control effort from each controller may be to maintain the network parameters (e.g., voltage profile) within its boundaries, knowing that the downstream controller(s) will perform in similar fashion to control the network parameters within its boundaries. In some embodiments, controller 420 may identify components of distribution system 110 downstream from controller 420 based on the network model. These components may include, for example, end-customer load, PV or distributed generation, and electrical vehicles (EVs). The network model may include prior knowledge from offline studies that includes behavior of these components based on, for example, weather patterns, location within distribution system 110, and capacity of the generators and EVs. In some embodiments, controller 420 predicts short-time variability in the components, and may include data such as look-up tables that, for example, link variability in different time scales as a function of power. In other embodiments, controller 420 may use power flow techniques to estimate various states of the network buses based on, for example, allocated loads and short-time variability. In some embodiments, power flow techniques are based on one or more of forward and backward sweep algorithms for estimating voltage and angles at various network buses. As such, controller 420 may generate switching commands for switching respective network components based on the estimated or anticipated states of the network buses.

Figure 7:
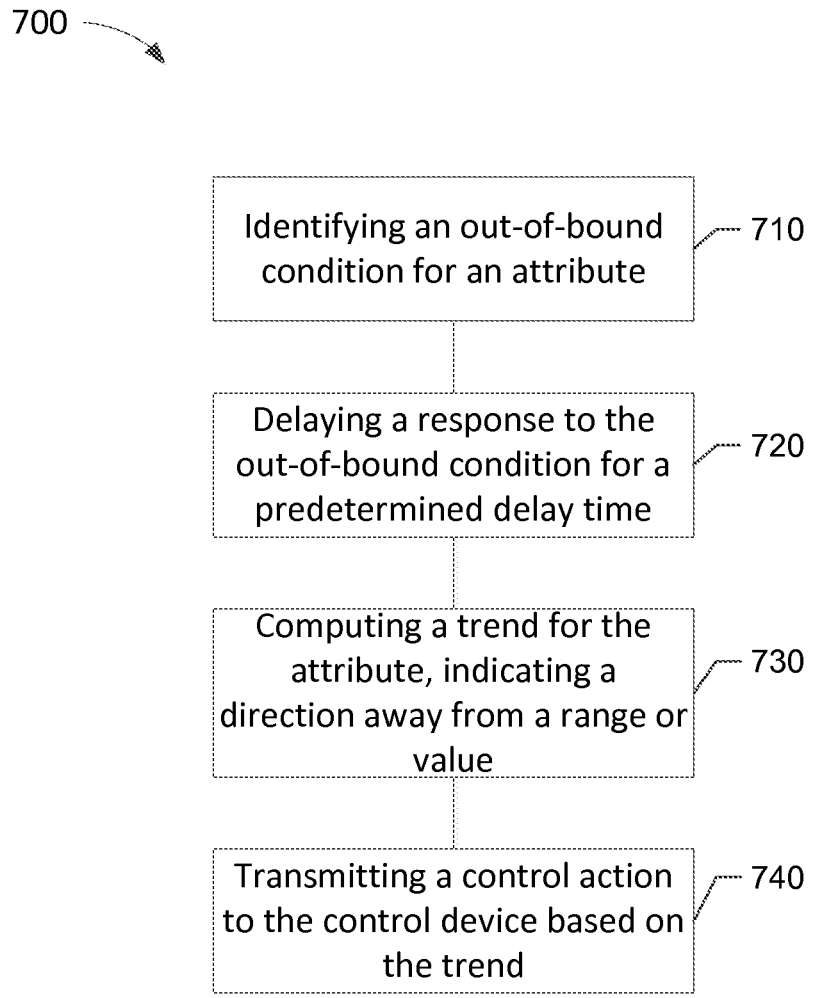
FIG. 7 is a flow chart of an exemplary method for performing control actions on the electrical power distribution system shown in FIG. 3 using the controller shown in FIG. 4.

FIG. 7 is a flow chart of an exemplary method 700 for performing control actions on distribution system 110 (shown in FIG. 3) using controller 420 (shown in FIG. 4). In the exemplary embodiment, method 700 is performed using a computing device including a processor coupled to a memory. In some embodiments, method 700 is performed using computing device 140 (shown in FIG. 2). In some embodiments, the control device is a voltage regulator and the at least one attribute is voltage, and method 700 includes identifying a predetermined range for voltage including one or more of a high threshold value and a low threshold value.

In the example embodiment, method 700 includes identifying 710, in the memory, an out-of-bound condition on the electrical power system at a first time, the out-of-bound condition associated with at least one attribute of the electrical power system. Method 700 also includes delaying 720 a response to the out-of-bound condition for a predetermined delay time. Method 700 further includes, after the predetermined delay time elapses, computing 730, by the processor, a trend for the at least one attribute at a second time that is later than the first time, the trend indicating a direction away from at least one of a predetermined range and a predetermined value. Method 700 also includes transmitting 740 a control action to the control device based at least in part on the trend.

In some embodiments, the control device is a voltage regulator, and transmitting 740 a control action includes transmitting a tap change command to the voltage regulator. In some embodiments, the at least one attribute is voltage, and identifying 710 an out-of-bound condition further includes computing a normalized voltage value from a plurality of voltage measurements of the electrical power system and comparing the normalized voltage value to one or more of the predetermined range and the predetermined value. Further, in some embodiments, computing 730 a trend for the at least one attribute includes computing a trend value representing a trajectory of the at least one attribute based on measurement values of the at least one attribute. In some embodiments, computing 730 a trend for the at least one attribute includes determining the trend using a network model of the electrical power distribution network. In other embodiments, computing 730 a trend for the at least one attribute includes computing the delay time based at least in part on a measured value of the at least one attribute.

Figure 8:
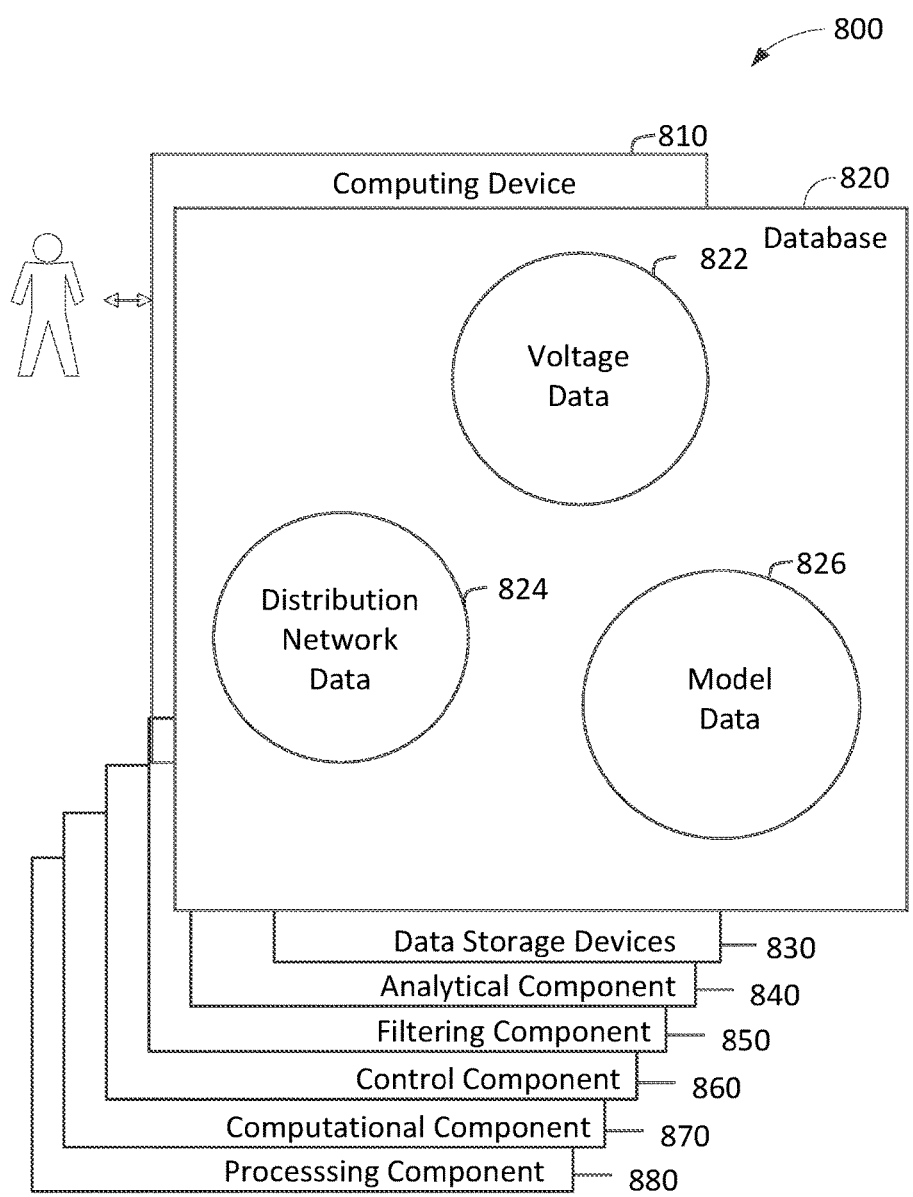
FIG. 8 illustrates an example configuration of a database within a computing device, along with other related computing components, that may be used to control switching operations on the electrical power distribution system shown in FIG. 3.

FIG. 8 illustrates an example configuration 800 of a database 820 within a computing device 810, along with other related computing components, that may be used to control switching operations on distribution system 110 (shown in FIG. 3). Database 820 is coupled to several separate components within computing device 810, which perform specific tasks. In the example embodiment, computing device 810 may be computing system 140 (shown in FIG. 2).

In the example embodiment, database 820 includes voltage data data 822, distribution network data 824, and model data 826. Voltage data 822 includes information associated with voltage values, such as the normalized and filtered voltage values, V, voltage trend values ΔV/Δt, and voltage thresholds, as described above. Distribution network data 824 includes information associated with an electrical power distribution network such as distribution system 110, and may include other operational data collected from the network. Model data 826 includes information associated with modeling distribution system 110, such as a full model or a reduced network model of, for example, distribution system 110.

Computing device 810 includes the database 820, as well as data storage devices 830. Computing device 810 also includes a analytical component 840 for operations such as receiving and processing voltage data 822, or processing computations associated with model data 826. Computing device 810 also includes a filtering component 850 for performing filtering and root mean square operations associated with voltage data 822. A control component 860 is also included for operations such as executing tap operations on voltage regulators. Computing device 810 further includes a computational component 870 for processing other values associated with voltage data 822, distribution network data 824, and model data 826. A processing component 880 assists with execution of computer-executable instructions associated with the system.

The embodiments illustrated and described herein, as well as embodiments not specifically described herein, but, within the scope of aspects of the disclosure, constitute exemplary means for controlling switching operations on an electrical power distribution network (e.g., distribution system 110). For example, computing system 140, and any other similar computer device added thereto or included within, when integrated together, include sufficient computer-readable storage media that is/are programmed with sufficient computer-executable instructions to execute processes and techniques with a processor as described herein. Specifically, computing system 140 and any other similar computer device added thereto or included within, when integrated together, constitute an exemplary means for controlling switching operations on an electrical power distribution network.

The above-described systems and methods provide a way to control switching operations on an electrical power distribution network having fluctuating power generators such as photovoltaic arrays. The distribution network has one or more control devices, such as a voltage regulator. The voltage regulator is managed by a switching controller to maintain voltage stability on the network. Voltage values are collected from the voltage regulator and normalized. Threshold values are identified, and describe a preferred operating range for the network. When voltage on the network deviates outside of the preferred operating range, a below- or above-threshold condition is initiated and a timer is started. After a prescribed period of time, the switching controller checks the voltage trend, and if the trend is still moving away from the preferred operating range, then switching controller executes a tap operation to bring the voltage back within the preferred range.

An exemplary technical effect of the methods, systems, and apparatus described herein includes at least one of: (a) analyzing trending on a distribution network to limit switching operations; (b) computing normalized voltage values that may be used to limit switching operations; (c) executing switching operations on the distribution network when voltage is trending away from a preferred range; and (d) analyzing a reduced network model of a distribution network to determine control operations on the network.

Exemplary embodiments of systems and methods for controlling switching operations on an electrical power distribution network are described above in detail. The systems and methods described herein are not limited to the specific embodiments described herein, but rather, components of systems or steps of the methods may be utilized independently and separately from other components or steps described herein. For example, the methods may also be used in combination with other systems involving analysis of data streams, and are not limited to practice with only the transmissions systems and methods as described herein. Rather, the exemplary embodiments can be implemented and utilized in connection with many other control applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical power system comprising:
    an electrical power distribution network;
    a control device configured to regulate at least one attribute of said electrical power system, wherein the at least one attribute includes voltage; and
    a processor coupled to said control device, said processor configured to:
        identify an out-of-bound condition on said electrical power distribution network at a first time, the out-of-bound condition associated with the at least one attribute;
        delay a response to the out-of-bound condition for a predetermined delay time;
        after the predetermined delay time elapses, determine a trend for the at least one attribute at a second time that is later than the first time, the trend comprising a trend value representing a trajectory of the at least one attribute based on measurement values of the at least one attribute; and
        transmit a control action to said control device based on a combination of the trend and future voltage prediction value determined from electrical power distribution network model analysis.

2. The electrical power system of claim 1, wherein said control device is a voltage regulator, wherein said processor is further configured to identify a predetermined range for voltage including one or more of a high threshold value and a low threshold value.

3. The electrical power system of claim 2, wherein said processor is further configured to transmit a tap change command to said voltage regulator.

4. The electrical power system of claim 2, wherein said processor is further configured to:
    compute a normalized voltage value from a plurality of voltage measurements of said electrical power system; and
    compare the normalized voltage value to the predetermined range.

5. The electrical power system of claim 1, wherein the trend is determined using a network model of said electrical power distribution network.

6. The electrical power system of claim 2, wherein said processor is further configured to compute the delay time based at least in part on a measured value of the at least one attribute and how far the measured value is away from the predetermined range.

7. The electrical power system of claim 2, wherein said processor is configured identify the out-of-bound condition on said electrical power distribution network by computing a normalized voltage value from a plurality of voltage measurements of the electrical power distribution network and comparing the normalized voltage value to the predetermined range.

8. The electrical power system of claim 2, wherein said processor is further configured transmit the control action to said control device based at least in part on second trends from other parts of said electrical power distribution network.

9. The electrical power system of claim 2, wherein the predetermined delay is adjusted when a present tap position of the voltage regulator is near the middle of the predetermined range.

10. The electrical power system of claim 3, wherein said processor is configured to determine the trend for the at least one attribute utilizing a model of said electrical power distribution network.

11. A computing device for an electrical power system including an electrical power distribution network, the electrical power distribution network including a control device, said computing device comprising a processor programmed to:
    identify an out-of-bound condition on the electrical power distribution system at a first time, the out-of-bound condition associated with the at least one attribute, wherein the at least one attribute includes voltage;

delay a response to the out-of-bound condition for a predetermined delay time;

after the predetermined delay time elapses, determine a trend for the at least one attribute at a second time that is later than the first time, the trend comprising a trend value representing a trajectory of the at least one attribute based on measurement values of the at least one attribute; and transmit a control action to the control device based on a combination of the trend and future voltage prediction value determined from electrical power distribution network model analysis.

12. The computing device of claim 11, wherein the control device is a voltage regulator, wherein said processor is further programmed to identify a predetermined range for voltage including one or more of a high threshold value and a low threshold value, wherein said processor is further programmed to transmit a tap change command to the voltage regulator.

13. The computing device of claim 12, wherein said processor is further programmed to:

compute a normalized voltage value from a plurality of voltage measurements of the electrical power system; and compare the normalized voltage value to the predetermined range.

14. The computing device of claim 11, wherein the trend is determined using a network model of the electrical power distribution network.

15. The computing device of claim 11, wherein said processor is further programmed to determine the delay time based at least in part on a measured value of the at least one attribute.

16. A computer-based method for performing control actions on an electrical power system including an electrical power distribution system, the electrical power distribution system including a control device, said method using a computing device including a processor coupled to a memory, said method comprising:

identifying, in the memory, an out-of-bound condition on the electrical power system at a first time, the out-of-bound condition associated with at least one attribute of the electrical power system, wherein the at least one attribute includes voltage;

delaying a response to the out-of-bound condition for a predetermined delay time;

after the predetermined delay time elapses, computing, by the processor, a trend for the at least one attribute at a second time that is later than the first time, the trend comprising a trend value representing a trajectory of the at least one attribute based on measurement values of the at least one attribute; and transmitting a control action to the control device based on a combination of the trend and future voltage prediction value determined from electrical power distribution network model analysis.

17. The method of claim 16, wherein the control device is a voltage regulator, said method further comprising identifying a predetermined range for voltage including one or more of a high threshold value and a low threshold value.

18. The method of claim 16, wherein the control device is a voltage regulator, wherein transmitting a control action includes transmitting a tap change command to the voltage regulator.

19. The method of claim 17, wherein identifying an out-of-bound condition further includes:

computing a normalized voltage value from a plurality of voltage measurements of the electrical power system; and comparing the normalized voltage value to the predetermined range.

20. The method of claim 16, wherein the trend is determined using a network model of the electrical power distribution network.

21. The method of claim 16, wherein the trend for the at least one attribute includes computing a delay time based at least in part on the measured value of the at least one attribute.

* * * * *